United States Patent [19]
Johnston

[11] 3,802,276
[45] Apr. 9, 1974

[54] CONSTRAINED GYRO FOR STRAPDOWN APPLICATION

[75] Inventor: James V. Johnston, Huntsville, Ala.

[73] Assignee: The United States of America as represented by the Secretary of the Army, Washington, D.C.

[22] Filed: Sept. 25, 1972

[21] Appl. No.: 292,198

[52] U.S. Cl............................................. 74/5.6 D
[51] Int. Cl............................................ G01c 19/28
[58] Field of Search .......... 338/2.6; 73/504; 74/5 R, 74/5.6

[56] References Cited
UNITED STATES PATENTS

| | | |
|---|---|---|
| 2,703,935 | 3/1955 | Mead et al........................ 74/5.6 X |
| 3,267,746 | 8/1966 | Scotto.................................. 74/5.6 |
| 3,147,627 | 9/1964 | Hunn.................................... 74/5.6 |
| 2,964,952 | 12/1960 | Hoover et al........................ 74/5.6 |
| 2,746,301 | 5/1956 | Henderson........................... 74/5.6 |
| 2,479,122 | 8/1949 | Konet.............................. 73/504 X |
| 2,567,682 | 9/1951 | Silberstein.......................... 74/5.6 |

Primary Examiner—Manuel A. Antonakas
Attorney, Agent, or Firm—Edward J. Kelly; Herbert Berl; Herbert H. Murray

[57] ABSTRACT

A structure wherein any output movement of the gyro float is constrained by a group of quartz crystal resonators. Any potential movement of the float causes a change in the frequency of vibration of the crystals thus giving digital information without any torque rebalance circuitry.

3 Claims, 2 Drawing Figures

CONSTRAINED GYRO FOR STRAPDOWN APPLICATION

BACKGROUND OF THE INVENTION

In previous strapdown gyro applications the gyro is constrained by pulse torquing wherein, the gyro is provided with pickoffs the output of which is fed through a very high gain servo loop to a torque motor. Since the pickoffs give analogue data, an analogue to digital convertor must be included in the servo loop. Also the torque motor requires application of comparatively large amounts of electrical power.

Since the torque motors are inductive in nature they require a finite time for current build-up and decay thereby causing serious limitations to the frequency response. Also, the heat generated causes serious problems with linearity because of the temperature instability.

It is therefore an object of the present invention to provide a gyro constraining technique which automatically gives an output in digital form.

Another object is to provide a device wherein no inductive type devices are used so that the mechanism is temperature stable.

SUMMARY OF THE INVENTION

In accordance with this invention a bar is attached to the output axis of the gyro and is restrained from movement by four piezoresistive crystals attached between the ends of the bar and the gyro case.

DETAILED DESCRIPTION OF THE INVENTION

Figure 1:
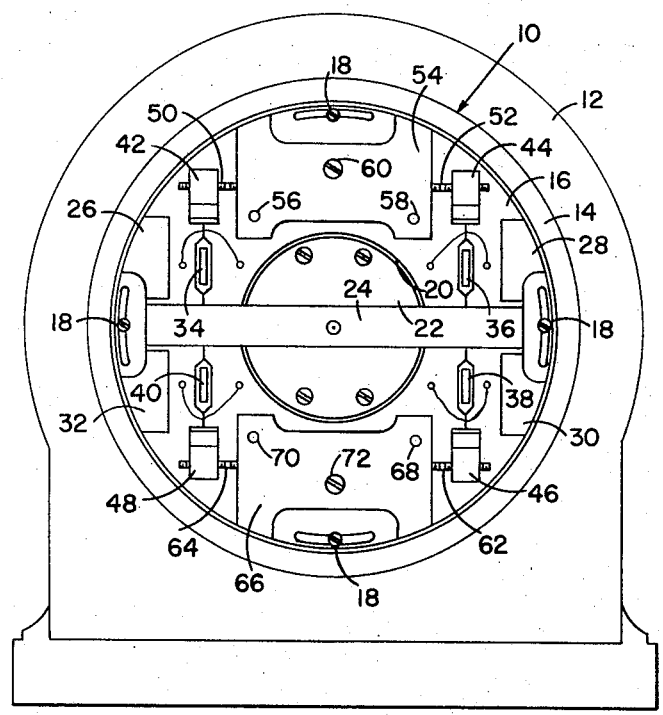
FIG. 1 is a plan view of one end of the gyro shown in a plane perpendicular to the output axis of the gyro.

Referring now to FIG. 1 the invention includes a gyro generally indicated 10 mounted within a mounting bracket 12. The gyro 10 has a casing 14. A plate 16 is fixed to the casing 14 by screws 18. The plate 16 is provided with a central opening 20 which surrounds the output shaft 22 of the gyro. A bar 24 is fixed to the output shaft 22. Four blocks 26, 28, 30 and 32 are fixed to the plate 16 and are so located as to limit excess rotary motion of bar 24.

Motion of bar 24 is normally limited by means of four quartz piezo-resistive crystal resonators 34, 36, 38 and 40 which are attached at their inner ends to opposite sides of the opposite ends of bar 24.

The resonators are quartz plated with gold to form closed double ended tuning forks. The outer ends of the crystal resonators are connected to four moveable blocks 42, 44, 46 and 48 respectively. Blocks 42 and 44 are threaded onto adjusting screws 50 and 52, respectively, which in turn are rotatably anchored in a large block 54 mounted on locator pins 56 and 58 fixed to plate 16. A screw 60 maintains the block 54 in position. Similarly blocks 46 and 48 are threaded onto adjusting screws 62 and 64, respectively, which in turn are rotatably anchored in a large block 66 mounted on locator pins 68 and 70 fixed to plate 16. A screw 72 maintains the block 66 in position.

Figure 2:
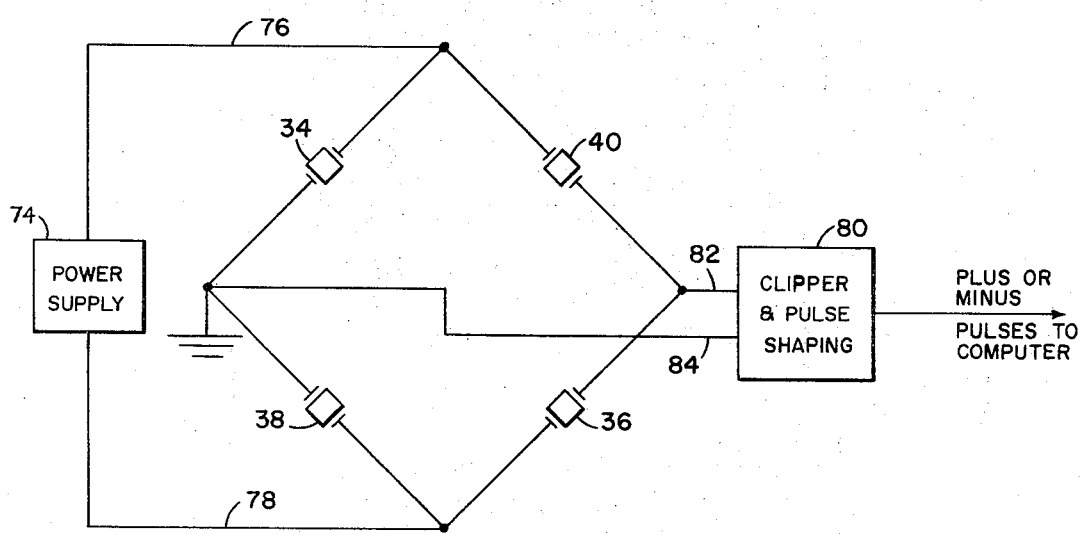
FIG. 2 is a schematic of the electrical circuit associated with the invention.

Referring now to FIG. 2 the quartz crystal resonators 34, 36, 38 and 40 are electrically connected in a bridge circuit. A power supply 74 is connected to opposite corners of the bridge by wires 76 and 78. The other two corners of the bridge are connected to a pulse clipping and pulse shaping circuit 80 by wires 82 and 84. The plus or minus pulses are then introduced to a missile control computer which controls the flight of the missile.

In the assembly of the mechanism the blocks 54 and 66 are stretched outwardly when they are slipped over the locating pins thus putting all four of the crystals 34, 36, 38 and 40 under tension. The adjusting screws 50, 52, 62 and 64 are then adjusted so that the frequency response of all of the crystals are equal.

In the operation of the device, any potential movement of bar 24 will cause an increase in tension in two of the crystal resonators and a decrease in tension in the other two. This change in tension will change the resonating frequency of the crystals in proportion to the torque applied. The two crystals with increased tension will shift to a higher frequency while the two crystals with decreased tension will shift to a corresponding lower frequency. The shifted frequencies are then summed in the bridge circuitry to obtain a differential frequency proportional to the applied torque.

Self correction can be achieved for gyro G sensitivities and temperature expansion. This is accomplished by selecting two crystals on opposite ends but on the same side of the torque arm. Whenever an acceleration is applied perpendicular to the torque arm, these two crystals will shift frequencies in the same direction, while the two crystals on the opposite side of the torque arm will shift frequency in the opposite direction. By differential summing of the high and low frequencies, a resonator frequency is achieved that is proportional to acceleration. This signal must then be summed with the original angular rate signals to provide compensation to the torquer force due to linear acceleration forces.

When crystals are selected to operate at the same frequency so that there is zero differential output in the quiescent state, there will be a tendency to "lock-on." The "lock-on" phenomenon will prevent frequency changes at low input rates, which are accompanied by deterioration of the linearity in the scale factor. This problem is overcome by selecting crystals which have sufficient difference in resonant frequency, so that the maximum shift, due to input rate, will not bring the frequencies within the lock-in range. This mechanization will provide a constant frequency output at null with an increasing and decreasing frequency for corresponding input rates.

I claim:

1. A gyro device comprising, a housing, a strapped down gyro in said housing, said gyro having an output shaft,
    a bar fixed to said output shaft extending transverse thereto,
    a plurality of crystal resonators fastened between the outer ends of said bar and said housing,
    means for applying tension to said resonators,
    circuit means connecting said resonators in a bridge structure,
    a constant frequency power means connected to the input of said bridge circuit, whereby any potential rotation of said bar will cause a change in the output frequency of said bridge circuit.

2. A strapped down gyro as set forth in claim 1 wherein, the means for applying tension to said resonators is such that the tension of each resonator can be varied individually.

3. A strapped down gyro as set forth in claim 2 wherein, the crystal resonators are quartz crystals gold plated to form closed double ended tuning forks.

* * * * *